United States Patent
Santos et al.

(10) Patent No.: US 10,151,604 B2
(45) Date of Patent: Dec. 11, 2018

(54) HIGH SPEED SENSING SYSTEM

(71) Applicant: The Timken Company, North Canton, OH (US)

(72) Inventors: Alfred J. Santos, Keene, NH (US); Lei Wang, Solon, OH (US); Mark E. Lacroix, Winchester, NH (US)

(73) Assignee: The Timken Company, North Canton, OH (US)

( * ) Notice: Subject to any disclaimer, the term of this patent is extended or adjusted under 35 U.S.C. 154(b) by 0 days.

(21) Appl. No.: 15/325,235

(22) PCT Filed: Aug. 13, 2014

(86) PCT No.: PCT/US2014/050822
§ 371 (c)(1),
(2) Date: Jan. 10, 2017

(87) PCT Pub. No.: WO2016/024959
PCT Pub. Date: Feb. 18, 2016

(65) Prior Publication Data
US 2017/0184419 A1  Jun. 29, 2017

(51) Int. Cl.
*G01D 5/14* (2006.01)
*G01D 3/02* (2006.01)
*G01D 5/244* (2006.01)

(52) U.S. Cl.
CPC .............. *G01D 5/145* (2013.01); *G01D 3/02* (2013.01); *G01D 5/24428* (2013.01)

(58) Field of Classification Search
CPC .......... G01D 5/14; G01D 5/142; G01D 5/145; G01D 3/02; G01R 33/06; G01R 33/07; G01R 33/075; G01R 33/077
See application file for complete search history.

(56) References Cited

U.S. PATENT DOCUMENTS

2008/0094055 A1* 4/2008 Monreal ................. G01D 3/02
324/117 H
2011/0084671 A1 4/2011 Hobelsberger et al.
(Continued)

FOREIGN PATENT DOCUMENTS

CN 201387335 Y 1/2010
CN 102047084 A 5/2011
(Continued)

OTHER PUBLICATIONS

International Search Report and Written Opinion for Application No. PCT/US2014/050822 dated Apr. 23, 2015.
(Continued)

*Primary Examiner* — Son Le
(74) *Attorney, Agent, or Firm* — Michael Best & Friedrich LLP

(57) ABSTRACT

A sensor system including a clock generation module, a sensor, a conditioning module, and an output module. The clock generation module is configured to generate a modulation signal and an output sampling signal. The modulation signal has a modulation frequency, and the sampling signal has a sampling frequency. The sensor is configured to generate an output signal having an output value. The output signal is modulated by the modulation signal, and the output value includes a sensor output value and an offset value. The conditioning module is configured to receive the output signal, condition the output signal, and generate a conditioned output signal including the sensor output value and the offset value. The output module is configured to receive the conditioned output signal and the output sampling signal. The output sampling signal is operable to sample the conditioned output signal at a value that corresponds to the sensor output value.

22 Claims, 6 Drawing Sheets

(56) References Cited

U.S. PATENT DOCUMENTS

2014/0145714 A1    5/2014  Okatake et al.
2014/0347044 A1*  11/2014  Monreal ................ G01R 33/07
                                                            324/251

FOREIGN PATENT DOCUMENTS

CN        103762813 A       4/2014
WO        2008/048379       4/2008

OTHER PUBLICATIONS

Chinese Patent Office Action for Application No. 201480081167.3 dated Jun. 28, 2018 (27 pages, English translation included).

* cited by examiner

HIGH SPEED SENSING SYSTEM

BACKGROUND

This invention relates to a high speed sensing system that includes a Hall Effect sensor.

SUMMARY

Encoder devices or sensor systems are used, for example, for position or speed detection. As an illustrative example, an encoder can include a moving member and an array of sensors that can be used to detect a position or speed of the moving member. Based on output signals from the sensors, the precise position or speed information for the encoder can be determined. For a rotary incremental encoder, the sensors are controlled to generate a pair of output signals (e.g., sinusoidal waveforms) that have a 90° phase difference (i.e., the output signals are in quadrature with one another) using a "spinning current" technique. The output signals are conditioned and sampled before being interpolated using a circuit known as an interpolator to generate high resolution waveforms. However, prior to the output signals being provided to the interpolator, a variety of offset errors can be introduced into the output signals which reduce the accuracy of the output signals.

Voltage offsets that are present within an encoder or sensor system can be caused by a variety of factors, such as mechanical stress, temperature change, sensor misalignment, the operation of the sensor itself, amplifiers, modulation signals, etc. The offsets of the sensors themselves can be reduced or mitigated by implementing, for example, the spinning current technique. However, other offsets, such as the offset that is introduced when the output signals from the sensor are modulated, creates high frequency ripples in the outputs of the sensors which must be removed by subsequent low-pass filter ("LPF") circuits. The magnitude of the ripples is proportional to the size of the offset. In order to properly remove these high-frequency components of the sensor's output signal, a LPF must have a sufficiently low cut-off frequency (e.g., approximately one-tenth of modulation frequency, approximately 25-50 kHz, etc.) to remove the high-frequency ripples and obtain high quality output signals from the sensors.

There are, however, drawbacks to using a LPF to filter out the high-frequency ripples. The LPF reduces the speed with which the output of the sensors can be sampled (i.e., the response speed of the system). Although other techniques, such as the use of a trimming circuit with memory, have been proposed for compensating for these offsets, such techniques undesirably increase the complexity of the sensing circuitry. This invention compensates for the offsets present in the sensing system using a sample-hold type method that produces output signals from the sensors that do not include high-frequency ripples and does not require the use of a low pass filter to filter such ripples (or a filter is used with a much higher cut-off frequency [e.g., a frequency close to the modulation frequency, approximately 250-500 kHz, etc.], which does not reduce circuit response speed).

Specifically, the invention described herein relates to sensor system that can sense the output of the sensor and provide an output signal associated with the sensor that is independent of offset errors from, for example, the sensor, a modulation signal, amplifiers, external factors (e.g., temperature variations), etc. The sensor system includes, for example, a moving member such as a rotating member, a sensor array, and circuitry that receives output signals from the sensors. The circuitry can include a front end (e.g., amplifiers, filters, etc., for conditioning the output signals of the sensors) and a controller, an interpolation module, or a comparator for generating high resolution signals related to, for example, a position or speed of the target, magnetic field strength, changes in magnetic field strength, etc. The front end circuit controls the switching of signals that are applied to the sensors to modulate the output signals, amplifies the output signals from the sensors, demodulates the output signals, filters the demodulated output signals, and samples the filtered signal to generate an output that can be provided to the controller or interpolation module. The filtered signal is sampled using an output gating signal such that the value of the sampled signal substantially corresponds to the output of the sensor and is substantially independent of offset errors from the sensor, a modulation signal, amplifiers, external factors (e.g., temperature variations), etc.

In one embodiment, the invention provides a sensor system that includes a clock generation module, a sensor, a conditioning module, and an output module. The clock generation module is configured to generate a modulation signal and an output sampling signal. The modulation signal has a modulation frequency, and the sampling signal has a sampling frequency. The modulation signal and the output sampling signal are phase shifted with respect to one another to produce a phase difference between the modulation signal and the output sampling signal. The sensor is configured to generate an output signal having an output value. The output signal is modulated by the modulation signal, and the output value includes a sensor output value and an offset value. The conditioning module is configured to receive the output signal, condition the output signal, and generate a conditioned output signal that includes the sensor output value and the offset value. The output module is configured to receive the conditioned output signal and the output sampling signal. The output sampling signal is operable to be used to sample the conditioned output signal at a value that substantially corresponds to the sensor output value.

In another embodiment, the invention provides a method of determining an output value for a sensor. The method includes generating a modulation signal having a modulation frequency and a first phase angle and generating an output sampling signal having a sampling frequency and a second phase angle. The modulation signal and the output sampling signal are phase shifted with respect to one another to produce a phase difference between the first phase angle of the modulation signal and the second phase angle of the output sampling signal. The method also includes generating an output signal from the sensor having an output value, conditioning the output signal to generate a conditioned output signal, receiving, at an output module, the conditioned output signal and the output sampling signal, and sampling the conditioned output signal using the output sampling signal. The output signal is modulated by the modulation signal and includes a sensor output value and an offset value. The conditioned output signal includes the sensor output value and the offset value, and the conditioned output signal is sampled at a value that substantially corresponds to the sensor output.

In another embodiment, the invention provides a sensor system that includes a rotary member, a Hall Effect sensor and a controller. The rotary member includes a pattern of magnetic poles, and the Hall Effect sensor is configured to generate an output signal based on the pattern of magnetic poles. The controller is configured to receive the output signal from the sensor. The controller is operable to generate a modulation signal having a modulation frequency and a first phase angle, generate an output sampling signal having a sampling frequency and a second phase angle, and modulate the output signal from the sensor using the modulation signal. The output signal has an output value that includes a sensor output value and an offset value. The controller is further operable to condition the output signal to generate a conditioned output signal that includes the sensor output value and the offset value, and sample the conditioned output signal using the output sampling signal at a value that substantially corresponds to the sensor output value. The modulation signal and the output sampling signal are phase shifted with respect to one another to produce a phase difference between first phase angle of the modulation signal and the second phase angle of the output sampling signal.

Other aspects of the invention will become apparent by consideration of the detailed description and accompanying drawings.

DETAILED DESCRIPTION

Figure 1:
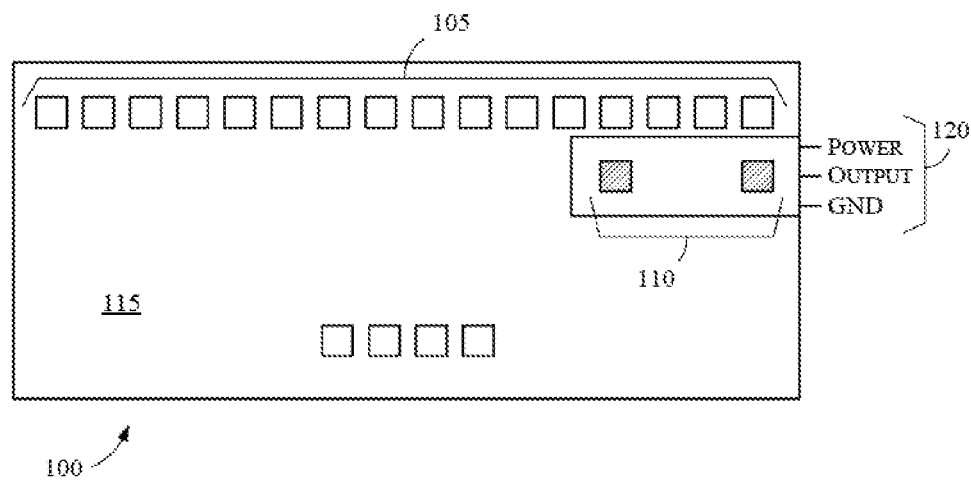
FIG. 1 illustrates a portion of a sensor system.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical connections or couplings, whether direct or indirect. Also, electronic communications and notifications may be performed using any known means including direct connections, wireless connections, etc.

It should be noted that a plurality of hardware and software based devices, as well as a plurality of different structural components may be utilized to implement the invention. Furthermore, and as described in subsequent paragraphs, the specific configurations illustrated in the drawings are intended to exemplify embodiments of the invention and that other alternative configurations are possible. The terms "processor" "central processing unit" and "CPU" are interchangeable unless otherwise stated. Where the terms "processor" or "central processing unit" or "CPU" are used as identifying a unit performing specific functions, it should be understood that, unless otherwise stated, those functions can be carried out by a single processor, or multiple processors arranged in any form, including parallel processors, serial processors, tandem processors or cloud processing/cloud computing configurations.

The invention described herein relates to an encoder, such as a linear or rotary encoder, that is capable of providing sensor output signals that are substantially independent of offset errors introduced by various portions of the encoder. For example, a rotary incremental encoder includes a rotating member and a sensor array for determining position and speed. The rotating member includes a pattern having, for example, alternating North and South magnetic poles that produce magnetic flux that is detected by the sensor array. Offset errors can be introduced into the output signals of the sensors in the sensor array by a variety of sources. For example, the sensors themselves, modulation signals, amplifiers, external factors (e.g., temperature variations, wear and tear, misalignment, etc.), etc., can all introduce offset errors. Such offset errors complicate the acquisition and processing of accurate and reliable sensor output signals. As a specific example, the introduction of a modulation offset from modulation signal (which can used to control bias current flow through a sensor) typically requires a low-pass filter ("LPF") having a relatively low cut-off frequency in order to remove the sensor and amplifier offset error. A side effect of using such a LPF with a low cut-off frequency is a corresponding reduction in the response time of the sensor system or encoder (e.g., the time it takes to provide a sensor output signal).

The invention includes implementing a circuit that samples or latches a value of the output signal of a sensor without requiring the above-noted LPF. For example, the invention can include one or more sensors (e.g., Hall Effect sensors) and a movable member in an encoder (e.g., a rotary incremental encoder). Switching circuitry responds to control signals to control the application of bias current and to control output voltage sensing for the one or more sensors. The switching circuitry modulates the output signals from the one or more sensors at a frequency corresponding to a modulation clock signal. The modulated output signals from the one or more sensors are amplified, demodulated, and provided to a filter that includes a relatively high cut-off frequency (i.e., higher than the undesirable LPF previously described). An output gating signal is generated that is phase shifted by approximately 90° (i.e., one quarter of a period). The output gating signal is used to sample the output signal of the filter (e.g., latch a value for the signal). The sampled value of the output signal is them provided to, for example, a controller or an interpolator for further processing. The sampled value for the output signal is substantially independent of offset errors from the encoder and the convention LPF that is used to filter out the offsets is not required. In some embodiments, although further filtering is not required, a second filter is provided that has a significantly higher cut-off frequency (e.g., a frequency close to the modulation frequency, approximately 250-500 kHz, etc.). Such a filter does not reduce the response time of the sensor system or encoder. This invention can be implemented with, for example, motion or speed detection systems associated with actuators such as motors.

Although the invention is described primarily with a rotary incremental encoder using magnetic poles and Hall Effect sensors, the invention can also be applied to absolute encoders, linear encoders, and encoders using sensors other than Hall Effect sensors. For illustrative purposes, the invention is described herein with respect to a rotary incremental encoder using Hall Effect sensors. Specifically, FIG. 1 illustrates a portion of a Hall Effect sensor system or encoder 100 that includes a high resolution Hall Effect sensor array 105 and one or more independent Hall Effect sensors 110. In some constructions, the sensor elements of the sensor system 100 are contained on a single integrated circuit 115. In other constructions, the independent Hall Effect sensors 110 have power, output, and ground connections 120 that are separate from the connections to the high resolution Hall Effect sensor array 105 (i.e., none of the power, output, and ground connections 120 are connected to the high resolution Hall Effect sensor circuit). Among the advantages of having separate power, output, and ground connections 120 is a reduced risk of electrostatic discharge ("ESD") damage to the high resolution sensor array 105 and the independent Hall Effect sensors 110. The independent Hall Effect sensors 110 generate analog or digital output signals. In some constructions, the high resolution Hall Effect sensor array 105 is similar to Timken model MPS32XF or MPS160 sensor arrays. In some embodiments the sensor array 105 includes one sensor. In other embodiments, the sensor array includes two or more sensors.

Figure 2:
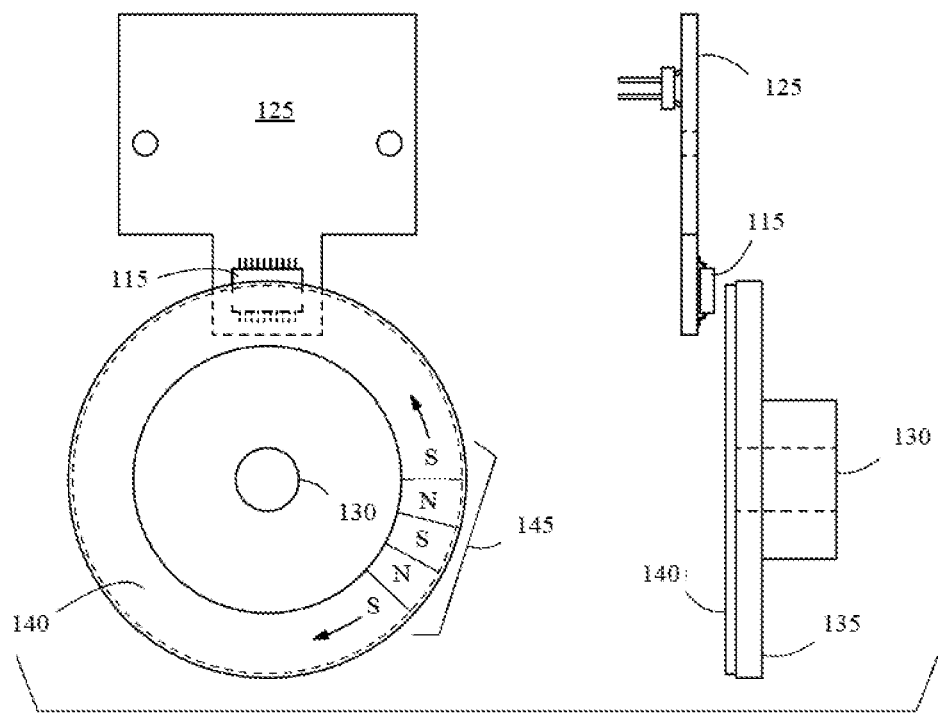
FIG. 2 illustrates a sensor system that includes a sensor array located adjacent to a rotatable member that includes alternating magnetic poles.

The portion of the sensor system 100 of FIG. 1 can be used with a movable member such as a rotatable member 130 (e.g. a wheel or shaft of a rotary encoder), as shown in FIG. 2. The portion of the sensor system 100 of FIG. 1 is illustrated in FIG. 2 as an integrated circuit 115 mounted on a circuit board 125. The high resolution sensor array 105 is disposed adjacent to a circular plate 135 having a magnetic region 140 at the outer edge with a plurality of alternating magnetic poles 145 embedded therein. The circular plate 135 may be attached to the rotatable member 130 or may be an integral part of the rotatable member 130.

Figure 3A:
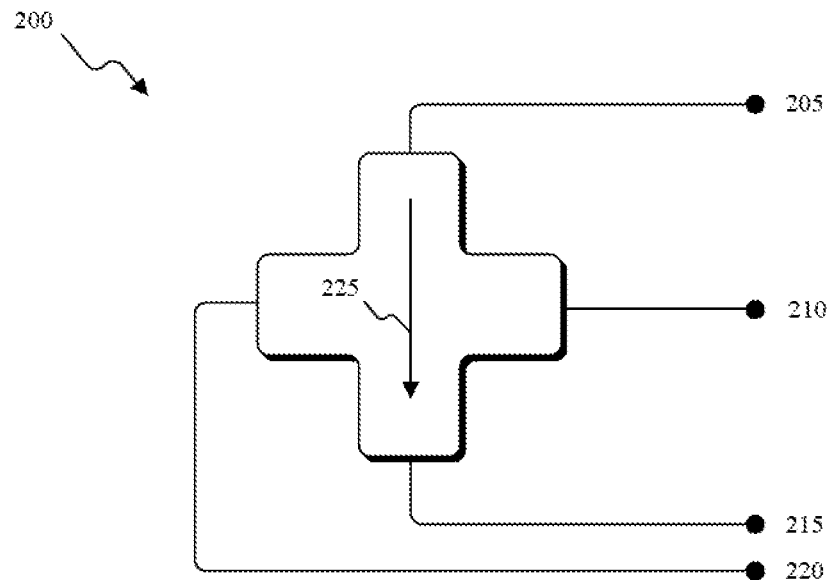
FIGS. 3A and 3B illustrate a Hall Effect sensor.
Figure 3B:
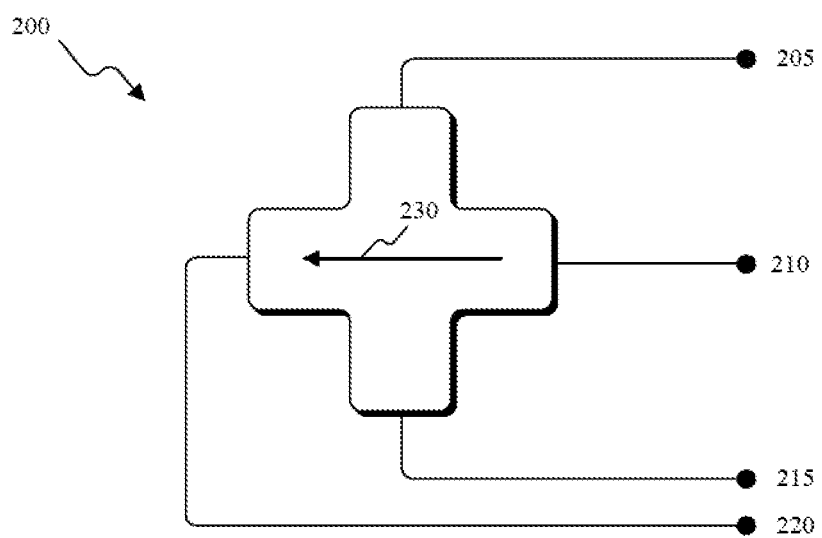

FIGS. 3A and 3B illustrate a single Hall Effect sensor 200 that includes four electrodes 205, 210, 215, and 220. Output signals for the Hall Effect sensor 200 are generated in quadrature using what is known as a "spinning current" technique. In the spinning current technique, switching circuitry periodically switches off or disconnects a current source from a first pair of electrodes 205 and 215 to prevent the flow of a bias current through the Hall Effect sensor 200 in a first direction 225, and then applies a bias current to a second pair of electrodes 210 and 220 to allow a bias current to flow through the Hall Effect sensor in a second direction 230. The switching circuitry similarly disconnects, for example, a front end circuit (e.g., including an output amplifier) from the second pair of electrodes 210 and 220, and connects the front end circuit to the first pair of electrodes 205 and 215 (see FIG. 4). As such, in FIG. 3A, a bias current is initially applied to the first pair of electrodes 205 and 215 and the second pair of electrodes 210 and 220 is used for sensing. In FIG. 3B, the bias current is applied to the second pair of electrodes 210 and 220 and the first pair of electrodes 205 and 215 are used for sensing. Thus, in FIG. 3B, the bias current flows through the Hall Effect sensor 200 in a direction 230 transverse to the direction 225 of the bias current shown in FIG. 3A.

In some embodiments, in one clock phase, the electrode 210 is switched to a positive input of a front end circuit and the electrode 220 is switched to the negative input of the front end circuit. Then, in a subsequent clock phase, the electrode 215 is switched to the positive input of the front end circuit and electrode 205 is switched to the negative input of the front end circuit. In such embodiments, a demodulation module is a low pass filter (e.g., resistors, capacitors, an active filter, combinations thereof, etc.) (see below).

In other embodiments, in one clock phase, the electrode 210 is switched to a positive input of the front end circuit and the electrode 220 is switched to the negative input of the front end circuit. Then, in a subsequent clock phase, the electrode 205 is switched to the positive input of the front end circuit and electrode 215 is switched to the negative input of the front end circuit. In such embodiments, the demodulation module is implemented to generate an output signal that includes ripples (e.g., based on clock frequency) representing offset errors and the average value of the output of the demodulation module. Additionally, as a result of the polarity of electrodes 205 and 215, an additional demodulation module or inverter may be included.

The switching of the electrodes 205, 210, 215, and 220 can be accomplished using, for example, a controller, a microcontroller, a microprocessor, an ASIC, an FPGA, etc. The switching associated with the spinning current technique is known in the art. This invention can also be used with a plurality of Hall Effect sensors, such as two or more Hall Effect sensors and two Hall Effect sensors can be connected together in a differential design (e.g., to help cancel Hall Effect sensor offset).

Figure 4:
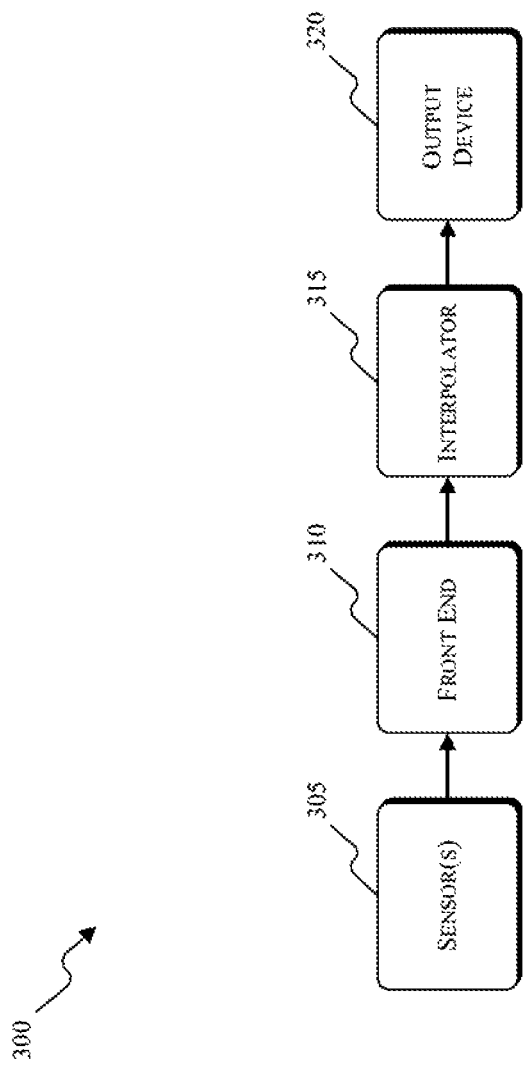
FIG. 4 is a block diagram of a sensor system according to an embodiment of the invention.

FIG. 4 illustrates a system block diagram 300 of the sensor system 100 of FIGS. 1 and 2. The system 100 includes sensor(s) 305 (e.g., one or more Hall Effect sensor(s) 305 similar to that shown in FIGS. 3A and 3B), a front end circuit 310, an interpolator 315, and an output device 320. The front end circuit 310 is, for example, a combination of active and passive circuit components that condition the output signals of the sensor(s) 305. The front end circuit 310 can include amplifiers, filters, gain control circuitry, analog-to-digital converters ("ADCs"), etc., for conditioning the output signals from the sensor(s) 305 prior to the conditioned output signals being provided to the interpolator 315.

The interpolator 315 generates high-resolution output signals for the sensor system 100 that can be provided to the output device 320. In various constructions, the interpolator 315 is implemented using hardware, software, or a combination of hardware and software. The interpolator 315 can, for example, be implemented as a controller, a microcontroller, a microprocessor, an application specific integrated circuit ("ASIC"), a field programmable gate array ("FPGA"), a logic circuit, a voltage comparator, etc. The operation of the interpolator 315 is described in greater detail below. The output device 320 is, for example, a device that receives the high resolution signals from the interpolator and performs further processing or control for a system (e.g., a motor system) based on detected position and/or speed. In some constructions, the output device 320 is a controller, a microcontroller, a microprocessor, an ASIC, an FPGA, etc. In some constructions, this invention is integrated into a known encoder ASIC, such as an ASIC manufactured by Timken.

In some constructions, the interpolator 315 and/or the output device 320 are implemented with a control or processing device. For example, the interpolator 315 and the output device 320 are implemented using a microprocessor-based system that generates the high resolution output signals for the Hall Effect sensor(s) 305, is capable of determining position, speed, and acceleration for the encoder, and is capable of generating one or more output control signals for controlling a system (e.g., a motor system). Such a construction is illustrated in FIG. 5.

Figure 5:
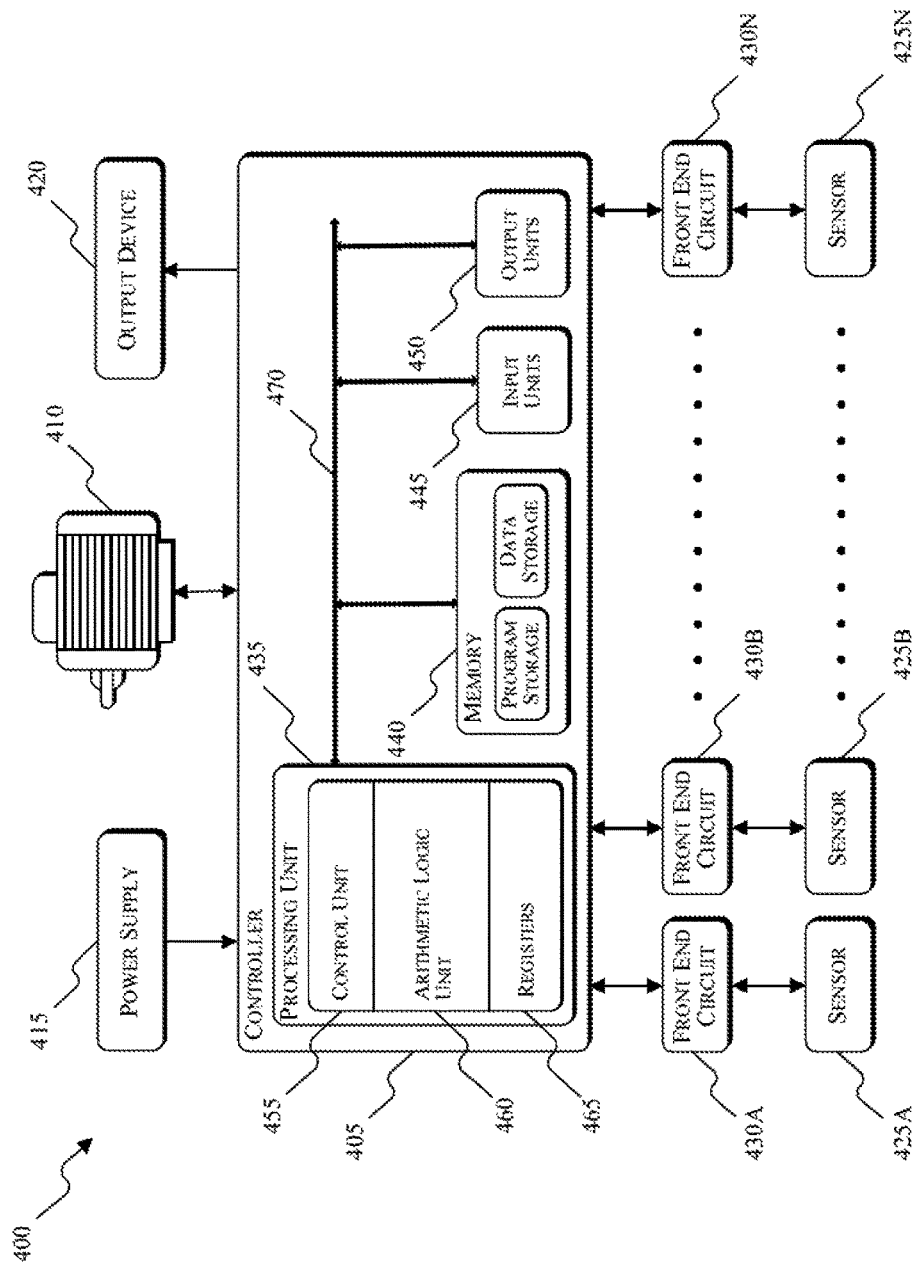
FIG. 5 is a block diagram of a sensor system according to another embodiment of the invention.

Specifically, FIG. 5 illustrates a sensor system 400 including a controller 405. The controller 405 is electrically and/or communicatively connected to a variety of modules or components of the system 400. For example, the illustrated controller 405 is connected to one or more actuation devices (i.e., motors) and drives 410, a power supply module 415, an output device 420, and a plurality of sensors 425A-425N (through corresponding front end circuitry 430A-430N), where N indicates some finite number of sensors included in the system 400. The controller 405 includes combinations of hardware and software that are operable to, among other things, monitor and/or control the operation of the system 400, control the movement of the actuation device 410, monitor the outputs of the Hall Effect sensors 425, etc. In some constructions, the front end circuitry 430A-430N are included in the controller 405.

In some embodiments, the controller 405 includes a plurality of electrical and electronic components that provide power, monitoring, and control to the system 400. For example, the controller 405 includes, among other things, a processing unit 435 (e.g., a microprocessor, a microcontroller, or another suitable programmable device), a memory 440, input units 445, and output units 450. The processing unit 435 includes, among other things, a control unit 455, an arithmetic logic unit ("ALU") 460, and a plurality of registers 465 (shown as a group of registers in FIG. 5), and is implemented using a known computer architecture, such as a modified Harvard architecture, a von Neumann architecture, etc. The processing unit 435, the memory 440, the input units 445, and the output units 450, as well as the various modules connected to the controller 405 are connected by one or more control and/or data buses (e.g., common bus 470). The control and/or data buses are shown generally in FIG. 5 for illustrative purposes. The use of one or more control and/or data buses for the interconnection between and communication among the various modules and components would be known to a person skilled in the art in view of the invention described herein. In some embodiments, the controller 405 is implemented partially or entirely on a semiconductor (e.g., an application specific integrated circuit ["ASIC"], a field-programmable gate array ["FPGA"] semiconductor) chip, etc.

The memory 440 includes, for example, a program storage area and a data storage area. The program storage area and the data storage area can include combinations of different types of memory, such as read-only memory ("ROM"), random access memory ("RAM") (e.g., dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. The processing unit 435 is connected to the memory 440 and executes software instructions that are capable of being stored in a RAM of the memory 440 (e.g., during execution), a ROM of the memory 440 (e.g., on a generally permanent basis), or another non-transitory computer readable medium such as another memory or a disc.

Software included in the implementation of the system 400 can be stored in the memory 440 of the controller 405. The software includes, for example, firmware, one or more applications, program data, filters, rules, one or more program modules, and other executable instructions. The controller 405 is configured to retrieve from memory and execute, among other things, instructions related to the control processes and methods described herein. In other constructions, the controller 405 includes additional, fewer, or different components.

The power supply module 415 supplies a nominal AC or DC voltage to the controller 405 or other components or modules of the system 400. The power supply module 415 is powered by, for example, a power source having nominal line voltages between 100V and 240V AC and frequencies of approximately 50-60 Hz. The power supply module 415 is also configured to supply lower voltages to operate circuits and components within the controller 405. In other constructions, the controller 405 or other components and modules within the system 400 are powered by one or more batteries or battery packs, or another grid-independent power source (e.g., a generator, a solar panel, etc.).

Figure 6A:
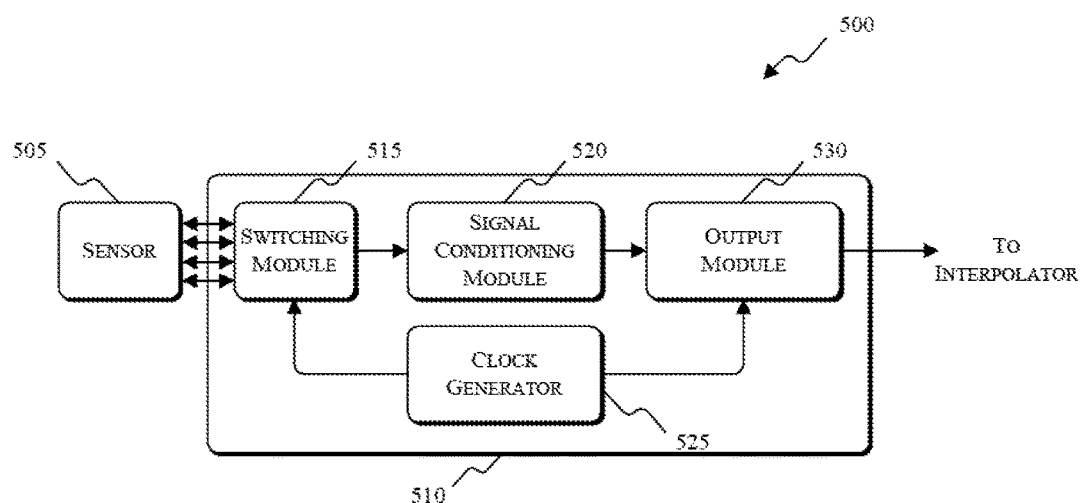
FIG. 6A is a block diagram of a sensor and front end circuitry according to an embodiment of the invention.

FIG. 6A illustrates a portion 500 of the sensor system 100 and shows a sensor 505 connected to a front end circuit 510. The output signals from the Hall Effect sensor 505 are modulated, amplified, and demodulated by the front end circuit 510. The front end circuit 510 includes a switching module 515, a signal conditioning module 520 that generates a conditioned output signal, a clock generator module 525, and an output gating module 530. Although the switching module 515 is illustrated as being included in the front end circuit 510, the switching module 515 can alternatively be separate from the front end circuit 510. For example, the switching circuit 515 can be connected between the sensor 505 and the front end circuit 510, or can be integrated with the sensor 505. The front end circuit 510 is configured in such a way that the front end circuit 510 provides a high-speed response Hall Effect switch system that is not sensitive to offsets from, for example, the Hall Effect sensor, amplifiers, modulation signals, etc. The front end circuit 510 and the system 500 also do not require a LPF having a low cut-off frequency (e.g., approximately one-tenth of modulation frequency, approximately 25-50 kHz, etc.). Thus, response time for the Hall Effect sensor 505 is improved, which enables, for example, a fast response from the Hall Effect sensor 505 to a power-on reset. In addition to not requiring the noted LPF, the sensor system 500 also does not require an offset trimming circuit and related protocols.

Figure 6B:
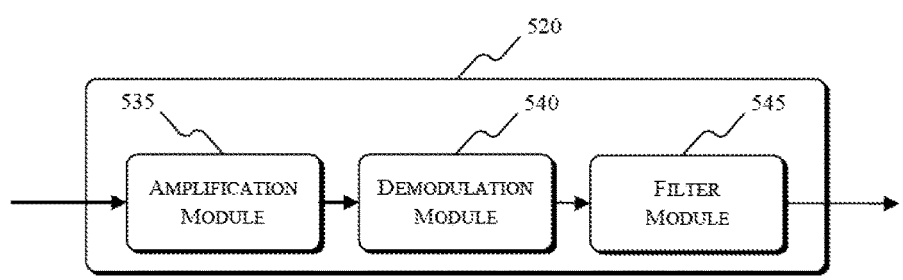
FIG. 6B is a block diagram of a conditioning module according to an embodiment of the invention.

As illustrated in FIG. 6B, the conditioning module 520 includes at least an amplification module 535, a demodulation module 540, and a filter module 545. The amplification module 535 includes, for example, at least one amplifier such as a differential amplifier. The amplifier receives the output positive and negative voltages from the Hall Effect sensor 505. The amplifier generates an amplifier output signal having a value equal to the magnitude of the difference between a positive and negative output voltage from the Hall Effect sensor 505 (i.e., the voltage across the Hall Effect sensor 505). The amplifier output signal can also include a non-unity gain such that the output is not directly equal to the magnitude of the difference between the positive and negative output voltages of the Hall Effect sensor 505. Rather the amplifier output is amplified by an amplification factor that is based on the configuration of the amplifier. The demodulation module 540 receives the output amplifier signal and generates a demodulation output signal. The general operation of the demodulation module 540 is known in the art and includes, for example, a sample- or track-and-hold type demodulation circuit. The demodulation output signal is provided to the filter module 545 which includes one or more filters. The filter can be a capacitor, a resistor-capacitor ("RC") filter, an active filter, a modulation-type filter which can be integrated with a demodulation circuit, etc. The specific output signals from the modules illustrated in FIGS. 6A and 6B will be described with respect to FIGS. 7-11.

Figure 7:
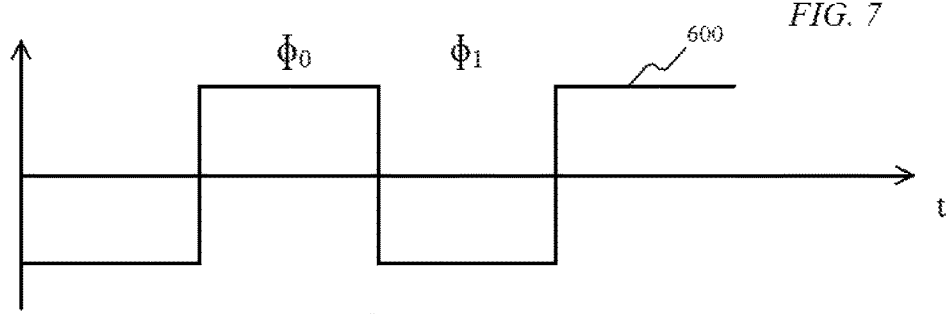
FIG. 7 illustrates a clock modulation signal according to an embodiment of the invention.

FIG. 7 illustrates a modulation clock signal 600. The modulation clock signal 600 has a phase angle (e.g., 0°) and alternates periodically between a positive value during a first phase, $\varphi_1$, and a negative value during a second phase, $\varphi_2$. The combination of $\varphi_1$ and $\varphi_2$ corresponds to one period of the modulation clock signal 600. The modulation clock signal 600 is provided to the switching module 515. The modulation clock signal 600 is used, for example, to control the direction of current flow through the Hall Effect sensor 505 (see FIGS. 3A and 3B). As a result, the modulation clock signal 600 causes the sensor 505 to output a periodically varying output signal having the frequency of the modulation clock signal 600.

When no magnetic field is being detected by the Hall Effect sensor 505, the modulated output of the Hall Effect sensor 505 will, for example, be provided alternatively in each clock phase from each of the two pair of electrodes as described in FIGS. 3A and 3B. The combination of the two phase signal is a varying signal that has an amplitude corresponding to the combined offsets of the sensor system (e.g., offset from the sensor itself, offset from the front end circuit, etc.). Such an output is approximately symmetric with respect to zero volts and thus has an average value of zero. When a magnetic field is present and detected by the Hall Effect sensor 505, the output of the Hall Effect sensor 505 has a value corresponding to a combination of the Hall Effect voltage of the Hall Effect sensor 505 and the offsets associated with the modulated output signal. The output signals from the Hall Effect sensor 505 are provided to the amplification module 535 (e.g., a differential amplifier) which, as described above, generates an amplifier output signal having a value related to the magnitude of the difference between a positive and negative output voltage from the Hall Effect sensor (i.e., the voltage across the Hall Effect sensor 505). Following amplification, the amplified output signal from the amplification module is demodulated by the demodulation module 540 to produce a demodulation output signal 605.

Figure 8:
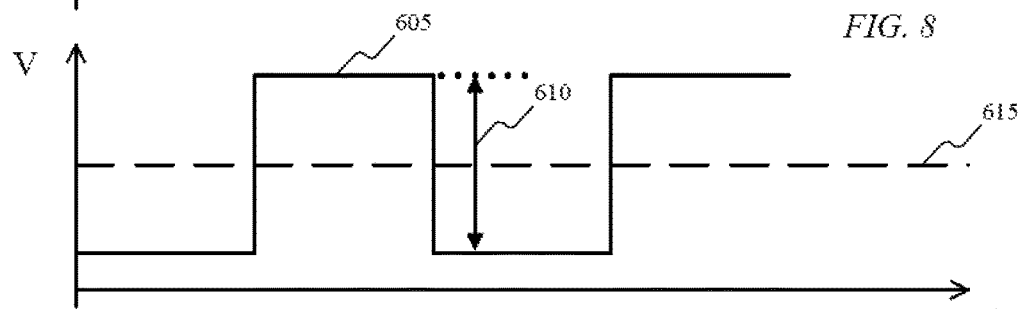
FIG. 8 illustrates a demodulated output signal according to an embodiment of the invention.

With reference to FIG. 8, the demodulation output signal 605 from the demodulation module 540 is illustrated. The signal 605 varies with time and has a peak-to-peak amplitude that corresponds to a sensor output value and the combined (e.g., positive and negative) offsets 610 associated with the sensor 505. In some embodiments, the offsets 610 also includes an offset of the front end circuitry. However, as a result of the symmetry of the signal 605, a sensed magnetic field strength output value 615 of the Hall Effect sensor 505 (independent of offset errors) corresponds to the average value of the signal 605. The output is shown as a constant value (i.e., a straight horizontal line) for illustrative purposes. During normal operation, the output value 615 of the Hall Effect sensor 505 can vary in amplitude with time.

Figure 9:
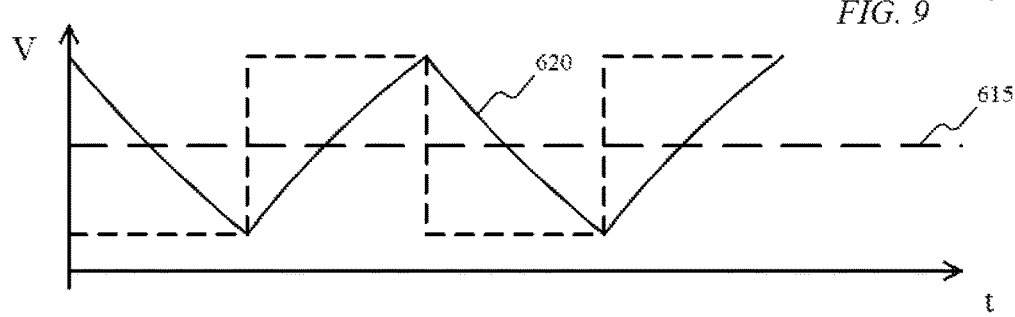
FIG. 9 illustrates a filtered output signal according to an embodiment of the invention.

The signal 605 of FIG. 8 is provided to the filter module 545. The filter module 545 can include a capacitor, an RC filter, an active filter, a modulation-type filter which can be integrated with a demodulation circuit, etc. As previously described, the filter module 545 is not the conventional LPF that is used to remove offset errors such as the high frequency ripples associated with a modulation offset. Rather, the filter module 545 has a higher cut off frequency that is not configured to remove the offset errors. The output of the filter module 545 is an approximately triangular-shaped signal 620. As shown in FIG. 9, the maximum positive peaks of the signal 620 approximately correspond to the maximum positive value of the signal 605 from FIG. 8 and are synchronized with the falling edge of the signal 605. Similarly, the minimum or negative peaks of the signal 620 approximately correspond to the minimum peak of the signal 605 from FIG. 8 and are synchronized with the rising edge of the signal 605. As also illustrated in FIG. 9, the value of the Hall Effect sensor output 615 approximately corresponds to the midpoint between the maximum and minimum peaks of the signal 620. In another embodiment, filter parameters are used to generate triangular-shaped signals with positive peak values lower than the maximum value of the square wave and negative peak values higher than the minimum value of the square wave.

Figure 10:
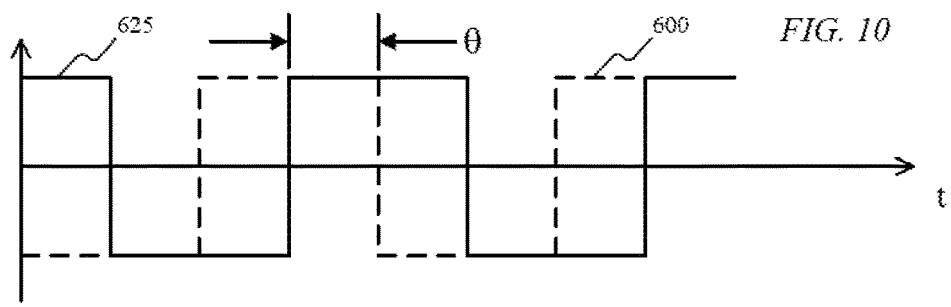
FIG. 10 illustrates a clock output gating signal according to an embodiment of the invention.
Figure 11:
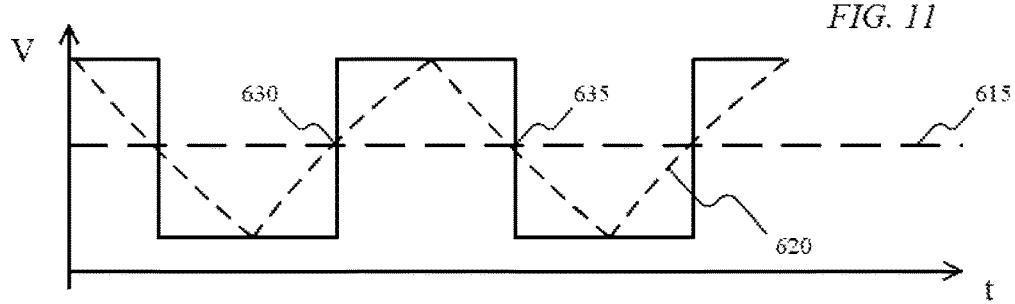
FIG. 11 illustrates the output gating signal of FIG. 10 being used to sample the filtered signal of FIG. 9.

FIG. 10 illustrates a sampling or output gating clock signal 625. The output gating clock signal 625 has a phase angle that corresponds to the modulation clock signal 600 but has a 90° phase difference. The output gating clock signal 625 is used to sample or latch data from a filtered sensor output signal, as described below. Specifically, the filtered signal 620 is sampled using the output gating clock signal 625 of FIG. 10, as illustrated in FIG. 11. Because the output gating clock signal 625 has been phase shifted by an angle, θ, of 90° from the modulation clock signal 600, the rising and falling edges of the output gating clock signal 625 approximately correspond to the midpoints 630 and 635 of the rising and falling edges, respectively, of the triangular-shaped filtered signal 620, and approximately correspond to the output of the Hall Effect sensor 615. As such, the output gating clock signal 625 is used to sample the output value of the Hall Effect sensor 505. By sampling the output of the Hall Effect sensor in such a manner, the output is independent of the offsets 610 introduced by the various portions of the sensor system described above. As a result, the output signal from the Hall Effect sensor that is to be provided to the interpolator (e.g., interpolator 315) no longer requires a LPF having a low cutoff frequency (e.g., approximately 25-50 kHz). Instead, the LPF can be omitted completely, or, as an alternative, a filter can be used that has a substantially higher cut-off frequency (e.g., 250 kHz). A filter having such a high cutoff frequency does not limit the response time of the sensor system.

In some embodiments, the filtered signal can be sampled at the rising edge of the output gating clock signal 625, the falling edge of the output gating clock signal 625, or at both the rising and falling edges of the output gating clock signal 625. Additionally or alternatively, the filtered signal can be sampled every two periods of the output gating clock signal or at an alternative lower rate. As a result, the sampling frequency of the filtered signal can be reduced if further reductions of the noise introduced into the output signal are desired.

Thus, the invention provides, among other things, a Hall Effect sensor system that is capable of generating an output that corresponds to the output value of a Hall Effect sensor and does not require a low-pass filter having a low cut-off frequency. Rather, a phase-shifted output gating signal is used to sample a conditioned output signal from the Hall Effect sensor at a value that substantially corresponds to the voltage output of the Hall Effect sensor. Various features and advantages of the invention are set forth in the following claims.

What is claimed is:

1. A sensor system comprising:
a clock generation module configured to generate a modulation signal and an output sampling signal, the modulation signal having a modulation frequency, the sampling signal having a sampling frequency, the modulation signal and the output sampling signal being phase shifted with respect to one another to produce a phase difference between the modulation signal and the output sampling signal;
a sensor configured to generate an output signal having an output value, the output signal being modulated by the modulation signal, the output value including a sensor output value and an offset value;
a conditioning module configured to receive the output signal, the conditioning module configured to condition the output signal to generate a conditioned output signal that includes the sensor output value and the offset value; and
an output module configured to receive the conditioned output signal and the output sampling signal, the output sampling signal operable to be used to sample the conditioned output signal at a value that substantially corresponds to the sensor output value.

2. The sensor system of claim 1, wherein the sensor is a Hall Effect sensor.

3. The sensor system of claim 1, wherein the phase difference is a 90 degree phase difference.

4. The sensor system of claim 1, wherein the conditioning module includes an amplifier and a filter.

5. The sensor system of claim 4, wherein the amplifier is a differential amplifier.

6. The sensor system of claim 4, wherein the conditioning module further includes a demodulation module.

7. The sensor system of claim 6, wherein a demodulation output signal from the demodulation module is an approximately rectangular-shaped signal and the demodulation output signal is provided to the filter.

8. The sensor system of claim 7, wherein an output of the filter is the conditioned output signal, the conditioned output signal being an approximately triangular-shaped signal.

9. The sensor system of claim 8, wherein the approximately triangular-shaped signal is sampled using the output sampling signal at approximately a midpoint between a peak maximum of the triangular-shaped signal and a peak minimum of the triangular-shaped signal.

10. A method of determining an output value for a sensor, the method comprising:
generating a modulation signal, the modulation signal having a modulation frequency and a first phase angle;
generating an output sampling signal, the output sampling signal having a sampling frequency and a second phase angle, the modulation signal and the output sampling signal being phase shifted with respect to one another to produce a phase difference between the first phase angle of the modulation signal and the second phase angle of the output sampling signal;
generating an output signal from the sensor having an output value, the output signal being modulated by the modulation signal, the output value including a sensor output value and an offset value;
conditioning the output signal to generate a conditioned output signal that includes the sensor output value and the offset value;
receiving, at an output module, the conditioned output signal and the output sampling signal; and
sampling the conditioned output signal using the output sampling signal at a value that substantially corresponds to the sensor output.

11. The method of claim 10, wherein the sensor is a Hall Effect sensor.

12. The method of claim 10, wherein the phase difference is a 90 degree phase difference.

13. The method of claim 10, further comprising amplifying the output signal to generate an amplified output signal, and demodulating the amplified output signal to generate a demodulation signal.

14. The method of claim 13, further comprising filtering the demodulation signal to generate the conditioned output signal.

15. The method of claim 14, wherein the conditioned output signal is an approximately triangular-shaped signal.

16. The method of claim 15, wherein the triangular-shaped conditioned output signal is sampled using the output sampling signal at approximately a midpoint between a peak maximum of the triangular-shaped conditioned output signal and a peak minimum of the triangular-shaped conditioned output signal.

17. A sensor system comprising:
a rotary member including a pattern of magnetic poles;
a Hall Effect sensor configured to generate an output signal based on the pattern of magnetic poles; and
a controller configured to receive the output signal from the sensor, the controller operable to
generate a modulation signal, the modulation signal having a modulation frequency and a first phase angle,
generate an output sampling signal, the output sampling signal having a sampling frequency and a second phase angle,
modulate the output signal from the sensor using the modulation signal, the output signal having an output value, the output value including a sensor output value and an offset value,
condition the output signal to generate a conditioned output signal that includes the sensor output value and the offset value, and
sample the conditioned output signal using the output sampling signal at a value that substantially corresponds to the sensor output value,
wherein the modulation signal and the output sampling signal are phase shifted with respect to one another to produce a phase difference between first phase angle of the modulation signal and the second phase angle of the output sampling signal.

18. The sensor system of claim 17, wherein the phase difference is a 90 degree phase difference.

19. The sensor system of claim 17, wherein conditioning the output signal to generate a conditioned output signal includes amplifying the output signal to generate an amplified output signal, and demodulating the amplified output signal to generate a demodulation signal.

20. The sensor system of claim 19, wherein conditioning the output signal to generate the conditioned output signal further includes filtering the demodulation signal to generate the conditioned output signal.

21. The sensor system of claim 20, wherein the conditioned output signal is an approximately triangular-shaped signal.

22. The sensor system of claim 21, wherein the triangular-shaped conditioned output signal is sampled using the output sampling signal at approximately a midpoint between a peak maximum of the triangular-shaped conditioned output signal and a peak minimum of the triangular-shaped conditioned output signal.

* * * * *